United States Patent
Mochizuki

(10) Patent No.: US 9,025,169 B2
(45) Date of Patent: May 5, 2015

(54) IMAGE FORMING APPARATUS

(71) Applicant: KYOCERA Document Solutions Inc., Osaka-shi, Osaka (JP)

(72) Inventor: Masayuki Mochizuki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/865,687

(22) Filed: Apr. 18, 2013

(65) Prior Publication Data

US 2013/0286419 A1    Oct. 31, 2013

(30) Foreign Application Priority Data

Apr. 25, 2012  (JP) ................. 2012-099734

(51) Int. Cl.
  G06K 15/02 (2006.01)
  G06K 15/00 (2006.01)
  G03G 15/00 (2006.01)

(52) U.S. Cl.
  CPC ............ *G06K 15/02* (2013.01); *G06K 15/4055* (2013.01); *G03G 15/5004* (2013.01)

(58) Field of Classification Search
  None
  See application file for complete search history.

(56) References Cited

U.S. PATENT DOCUMENTS

2010/0118331 A1*  5/2010  Murata .................. 358/1.15

FOREIGN PATENT DOCUMENTS

| JP | 2003-29595 | | 1/2003 |
| JP | 2003029595 A | * | 1/2003 |
| JP | 2007-243547 | | 9/2007 |

OTHER PUBLICATIONS

Office Action issued in Japanese Patent Application No. 2012-099734.

* cited by examiner

*Primary Examiner* — Steven Kau
*Assistant Examiner* — Andrew H Lam
(74) *Attorney, Agent, or Firm* — Gerald E. Hespos; Michael J. Porco; Matthew T. Hespos

(57) ABSTRACT

An image forming apparatus includes a power receiving unit, a power supply unit, an image forming unit, an execution control unit, a switching command receiving unit, a storage unit, and a power shutdown detection unit. The execution control unit executes, when started, a mode which is indicated by start mode information stored in the storage unit. The execution control unit causes the storage unit to store information indicating the standby mode as the start mode information if power shutdown is not detected when the standby mode is started, and causes the storage unit to store information indicating the execution mode as the start mode information if power shutdown is not detected when the execution mode is started.

3 Claims, 4 Drawing Sheets

IMAGE FORMING APPARATUS

This application relates to and claims priority from Japanese Patent Application No. 2012-099734, filed on Apr. 25, 2012 with the Japan Patent Office, the entire disclosure of which is incorporated herein by reference.

BACKGROUND

The present disclosure relates to an image forming apparatus having an execution mode where an image forming command is allowed to be received from a user, and a standby mode where the image forming command is not received.

In recent years, in response to the sophistication of image forming apparatuses, known is an image forming apparatus having, as a power switch to be operated by a user, an operational switch for outputting a signal to a control unit of the image forming apparatus when pressed by the user, rather than an open/close switch for directly opening/closing supply of the power-supply voltage. The reasons why supply of a power-supply voltage is not directly opened/closed with a power switch are as follows.

In other words, with a sophisticated image forming apparatus, required is termination processing of shutting down the power after storing the internal state of the apparatus or shutting down the power after completing the currently running process. Thus, in order to maintain the power supply for the control unit to execute the termination processing after the user presses the power switch, the power is not shut down even when the power switch is pressed.

In addition, when the user presses the power switch to turn OFF the power, a signal is sent to the control unit. Subsequently, the control unit switches to a standby state (standby mode) which corresponds to the power OFF state after the termination processing is executed. In other words, in preparation for the case where the user turns ON the power switch for starting the image forming apparatus, the control unit is standing by in a state where a signal from the power switch can be received even in a power OFF state.

In other words, a state where the image forming apparatus is in the standby mode corresponds to a state where the power of the image forming apparatus has been turned OFF when viewed from the user.

When the user turns ON the power switch in the standby state (standby mode), the signal thereof is sent from the power switch to the control unit. Subsequently, the control unit switches to an ON state (execution mode) where image formation can be executed, and executes image formation according to a command from the user.

As described above, in a case where the power OFF state as viewed by the user corresponds to the standby mode and the power ON state as viewed by the user corresponds to the execution mode, when the external power supply to the apparatus is cut off, for example, as a result of the power plug of the image forming apparatus being pulled out of the outlet or due to a power outage, and the power is thereafter restored, it is desirable that the apparatus is started in the mode that was being used before the power shutdown.

Thus, known is an image forming apparatus which detects that the user has turned OFF the power switch, stores the state of the apparatus in a nonvolatile storage medium, and, when the apparatus is restarted, reads the state of the apparatus stored in the nonvolatile storage medium, and performs operations according to the read state.

Meanwhile, a power circuit which generates an operational power-supply voltage for operating the apparatus from a commercial AC power comprises a capacitor for smoothing the power-supply voltage. The capacitor stores a certain degree of power. Thus, even when the external power supply to the image forming apparatus is cut off, supply of the operational power-supply voltage will continue for awhile based on the power stored in the capacitor. The operation of the control unit is consequently continued.

In particular, power consumption in the standby mode is defined, for example, in Lot6 (standby power, OFF mode power consumption reference) of the EuP Directive (Directive on Eco-Design of Energy-using Products). Lot6 prescribes that the power consumption during the standby mode must not exceed 0.5 W. Thus, the power consumption of an image forming apparatus compatible with the EuP Directive is extremely small. Consequently, after the external power supply to the image forming apparatus is cut off, there are cases where the operation of the control unit will continue for several seconds; for instance, for about 6 seconds, based on the power stored in the capacitor.

Consequently, according to the foregoing image forming apparatus, for example, when the external power supply to the apparatus is cut off as a result of the power plug of the image forming apparatus being pulled out of the outlet or due to the occurrence of a power outage, and a signal is thereafter sent from the power switch to the control unit when the user unintentionally touches the power switch, there are cases where the mode that was changed after the power supply shutdown is stored in the nonvolatile storage medium. In the foregoing case, when the power supply is restored and the image forming apparatus is started, the apparatus will be started up based on the mode stored in the nonvolatile storage medium; that is, the mode that was changed after the power supply of the apparatus was shut down.

Nevertheless, since the user will not normally think that the status of the apparatus would change after the power plug is pulled out from the outlet or after the occurrence of a power outage, when the apparatus is started based on the mode that was changed after the previous power shutdown when the power supply is restored, there is a drawback in that the operation of the apparatus becomes unnatural from the user's perspective.

An object of the present disclosure is to provide an image forming apparatus capable of improving the certainty that, when an external power supply is cut off and the supply of power is thereafter resumed, the image forming apparatus will be started in the mode that was being used when the power supply was cut off.

SUMMARY

The image forming apparatus according to one aspect of the present disclosure includes a power receiving unit, a power supply unit, an image forming unit, a switching command receiving unit, a storage unit, an execution control unit, and a power shutdown detection unit. The power receiving unit receives an external power-supply voltage. The power supply unit generates a predetermined operational power-supply voltage based on the power-supply voltage received by the power receiving unit. The image forming unit forms an image on a sheet. The switching command receiving unit receives a switching command which commands switching between an execution mode where an image forming command which commands image formation by the image forming unit is allowed to be received and a standby mode where the image forming command is not received. The storage unit is nonvolatile. The storage unit stores start mode information which indicates a mode of either the standby mode or the execution mode to be executed upon start-up. The execution control unit runs with the operational power-supply voltage and selectively executes the execution mode and the standby mode as well as controls the storage unit. The power shutdown detection unit detects that the power-supply voltage has been cut off. The execution control unit is started when supply of the operational power-supply voltage is started and executes a mode which is indicated by the start mode information stored in the storage unit, executes the execution mode when the switching command is received by the switching command receiving unit during execution of the standby mode, executes the standby mode when the switching command is received by the switching command receiving unit during execution of the execution mode, causes the storage unit not to store information indicating the standby mode as the start mode information if the power shutdown detection unit detects that the power-supply voltage has been cut off when the standby mode is started, causes the storage unit to store information indicating the standby mode as the start mode information if the power shutdown detection unit does not detect that the power-supply voltage has been cut off when the standby mode is started, causes the storage unit not to store information indicating the execution mode as the start mode information if the power shutdown detection unit detects that the power-supply voltage has been cut off when the execution mode is started, and causes the storage unit to store information indicating the execution mode as the start mode information if the power shutdown detection unit does not detect that the power-supply voltage has been cut off when the execution mode is started.

DETAILED DESCRIPTION

Figure 1:
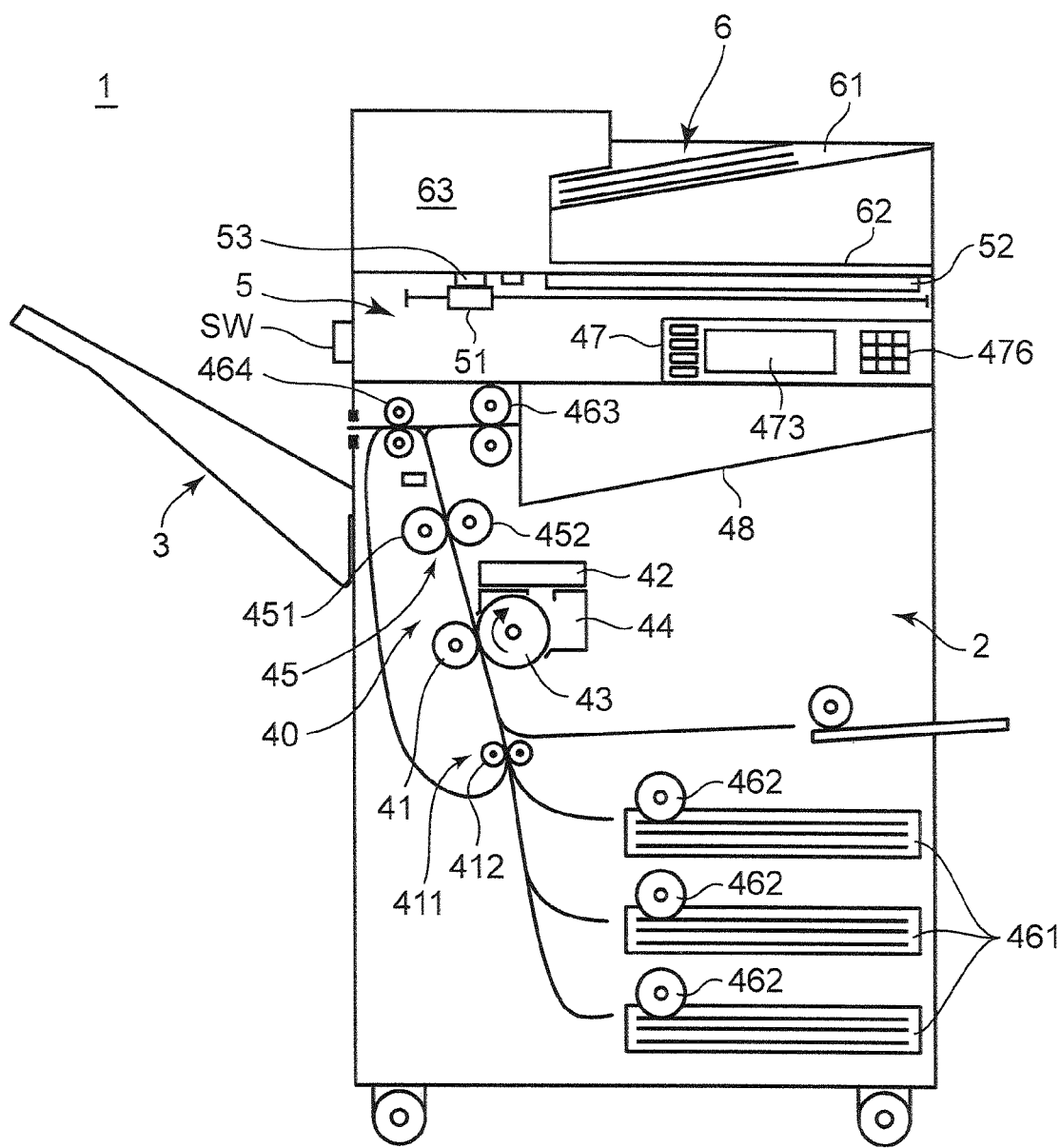
FIG. 1 is a structural diagram schematically showing the internal configuration of a copying machine as an example of the image forming apparatus according to one embodiment of the present disclosure.
Figure 2:
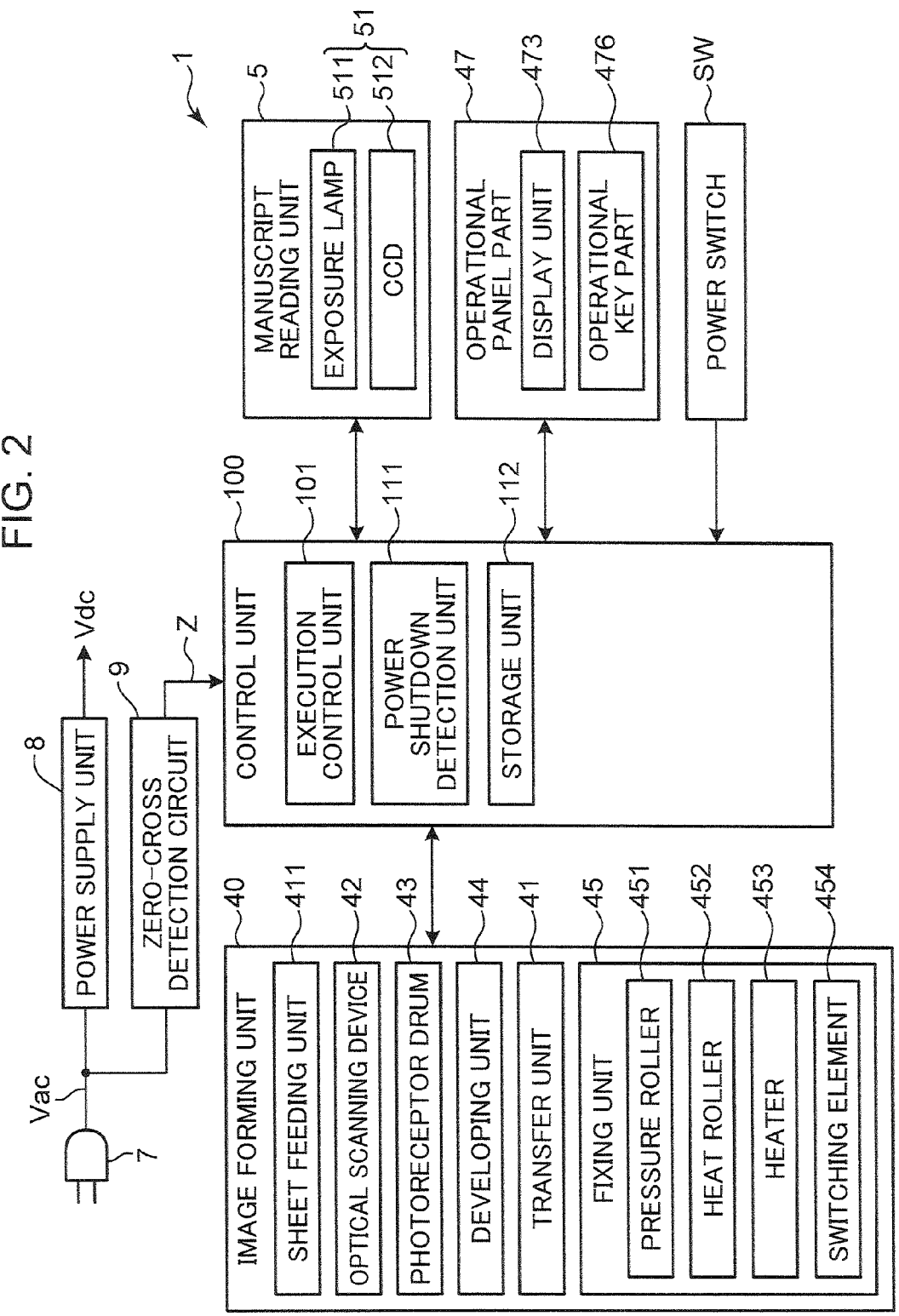
FIG. 2 is a block diagram showing an example of the electrical configuration of the copying machine shown in FIG. 1.

An embodiment according to the present disclosure is now explained with reference to the drawings. Note that the configuration that is given the same reference numeral in the respective drawings indicate the same configuration, and the explanation thereof is omitted. FIG. 1 is a structural diagram schematically showing the internal configuration of a copying machine as an example of the image forming apparatus according to one embodiment of the present disclosure. FIG. 2 is a block diagram showing an example of the electrical configuration of the copying machine 1 shown in FIG. 1. Note that the image forming apparatus is not limited to a copying machine, and may also be a printer, a facsimile, or a multi-function machine comprising these functions.

The copying machine 1 includes a main body part 2, a stack tray 3 disposed on the left side of the main body part 2, a manuscript reading unit 5 disposed at the upper part of the main body part 2, and a manuscript feeding part 6 disposed above the manuscript reading unit 5.

The front part of the copying machine 1 is provided with a substantially oblong operational panel part 47. The operational panel part 47 comprises a display unit 473, and an operational key part 476. The display unit 473 is configured, for example, from a liquid crystal display having a touch panel function. The operational key part 476 comprises, for example, a start key for the user to input an image forming command, and various key switches such as a numerical keypad for inputting the number of sheets to be printed and so on.

Moreover, for example, a power switch SW (switching command receiving unit) is disposed on the side of the manuscript reading unit 5.

The manuscript reading unit 5 comprises a scanner unit 51 configured from a charge coupled device (CCD) 512 and an exposure lamp 511 and so on, a manuscript mount 52 configured from a transparent member such as a glass, and a manuscript reading slit 53. The scanner unit 51 is configured to be movable by a driving unit not shown, and, upon reading the manuscript mounted on the manuscript mount 52, is moved along the manuscript face at a position facing the manuscript mount 52, and outputs, to a control unit 100, image data that was acquired by scanning the manuscript image. Moreover, upon reading the manuscript fed by the manuscript feeding part 6, the scanner unit 51 is moved to a position facing the manuscript reading slit 53, acquires the image of the manuscript in sync with the transport operation of the manuscript by the manuscript feeding part 6 via the manuscript reading slit 53, and outputs the acquired image data to the control unit 100.

The manuscript feeding part 6 comprises a manuscript mounting part 61 for mounting the manuscript, a manuscript discharging part 62 for discharging the manuscript from which the image thereof has been read, and a manuscript feeding mechanism 63 for feeding the manuscript mounted on the manuscript mounting part 61 one sheet at a time to a position facing the manuscript reading slit 53, and discharging the fed manuscript to the manuscript discharging part 62.

The main body part 2 comprises a plurality of paper feed cassettes 461, a paper feeding roller 462 for feeding one sheet at a time from the paper feed cassette 461 and transporting the sheet to the image forming unit 40, and an image forming unit 40 for forming an image on the sheet that was transported from the paper feed cassette 461.

The image forming unit 40 comprises a sheet transport part 411, an optical scanning device 42, a photoreceptor drum 43, a developing unit 44, a transfer unit 41, and a fixing unit 45. The sheet transport part 411 comprises a transport roller 412 and is provided on the sheet transport path within the image forming unit 40 and used for supplying, to the photoreceptor drum 43, the sheet that was transported by the paper feeding roller 462, and transport rollers 463, 464 for transporting the sheet to the stack tray 3 or the discharge tray 48.

The optical scanning device 42 forms an electrostatic latent image on the photoreceptor drum 43 by outputting a laser beam or the like based on the image data output from the control unit 100 and thereby exposing the photoreceptor drum 43. The developing unit 44 forms a toner image by developing the electrostatic latent image on the photoreceptor drum 43 by using a toner. The transfer unit 41 transfers the toner image on the photoreceptor drum 43 to the sheet.

The fixing unit 45 heats the sheet onto which the toner image was transferred, and thereby fixes the toner image onto the sheet.

Referring to FIG. 2, the fixing unit 45 includes a heat roller 452 for melting the toner image formed on the sheet, a pressure roller 451 for transporting the sheet while pressing the sheet with the heat roller 452, a heater 453 (heating unit), and a switching element 454. The heater 453 is disposed within the heat roller 452. The heater 453 heats the sheet nipped between the heat roller 452 and the pressure roller 451 by heating the heat roller 452. Configuration of the heater 453 and the switching element 454 will be explained in detail later.

The power switch SW is, for example, a button switch. The power switch SW is turned ON when pressed by the user, and turned OFF when released by the user. The power switch SW outputs the signal indicating ON/OFF to the control unit 100 as the switching signal (switching command) for commanding the mode switch between a standby mode (power OFF state) and an execution mode (power ON state). The power switch SW corresponds to an example of the switching command receiving unit.

The copying machine 1 additionally comprises a power plug 7 (power receiving unit), a power supply unit 8, and a zero-cross detection circuit 9.

The power plug 7 is a power plug that can be connected to a commercial AC power. When the user connects the power plug 7 to a commercial AC power, an AC power-supply voltage Vac (power-supply voltage) supplied from the commercial AC power is supplied to the power supply unit 8 via the power plug 7.

The power supply unit 8 is a power circuit for converting the AC power-supply voltage Vac into a DC-based operational power-supply voltage Vdc. In addition, the power supply unit 8 supplies the operational power-supply voltage Vdc to the respective parts within the copying machine 1.

The power supply unit 8 comprises, for example, a large-capacity capacitor for smoothing the AC power-supply voltage Vac. Thus, when the power plug 7 is connected to the commercial AC power, an electrical charge is charged to the capacitor of the power supply unit 8. Even when the AC power-supply voltage Vac is cut off as a result of the power plug 7 being pulled out from the commercial AC power or due to an occurrence of a power outage, the power supply unit 8 continues to output the operational power-supply voltage Vdc while discharging the electrical charge that was charged to the capacitor for awhile; for instance, for a period of roughly 6 seconds.

Figure 3:
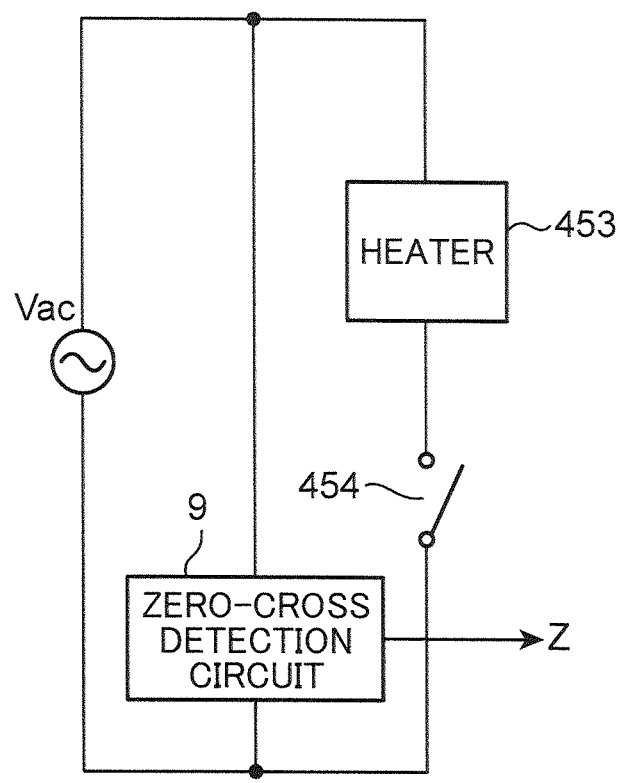
FIG. 3 is a circuit diagram explaining the heater, the switching element, and the zero-cross detection circuit.

FIG. 3 is a circuit diagram explaining the heater 453, the switching element 454, and the zero-cross detection circuit 9. The heater 453 and the switching element 454 are connected in series. In addition, the AC power-supply voltage Vac received by the power plug 7 is applied to the series circuit of the heater 453 and the switching element 454. The switching element 454 is turned ON/OFF according to the control signal from the control unit 100.

The switching element 454 is, for example, a triac. Note that the switching element 454 does not necessarily have to be a triac so as long as it can switch the AC power-supply voltage Vac.

The zero-cross detection circuit 9 detects the zero-cross timing that the AC power-supply voltage Vac passes through 0 V (becomes 0 V from a voltage value other than 0 V, and then becomes a voltage value other than 0 V). In addition, the zero-cross detection circuit 9 outputs the zero-cross signal Z indicating the zero-cross timing to the control unit 100.

The control unit 100 is configured by comprising, for example, a central processing unit (CPU) which executes predetermined arithmetic processing, a read only memory (ROM) which stores predetermined control programs, a random access memory (RAM) which temporarily stores data, a rewritable nonvolatile storage unit 112, and the peripheral circuits thereof. Connected to the control unit 100 are a manuscript reading unit 5, an image forming unit 40, an operational panel part 47, a power switch SW, and a zero-cross detection circuit 9. The control unit 100 is operated by the operational power-supply voltage Vdc output from the power supply unit 8.

The storage unit 112 stores the start mode information which indicates a mode of either the standby mode or the execution mode to be executed upon start-up. As the storage unit 112, for example, various rewritable nonvolatile memories such as an electrically erasable and programmable read only memory (EEPROM), a ferroelectric random access memory (FeRAM), a flash memory and the like may be used.

The control unit 100 functions as the execution control unit 101 and the power shutdown detection unit 111, for example, by executing the control programs stored in the ROM.

The power shutdown detection unit 111 determines that the AC power-supply voltage Vac has been cut off when a state where the zero-cross signal Z indicating the zero-cross timing is not output from the zero-cross detection circuit 9 (state where the rising edge or falling edge of the zero-cross signal Z is not detected) continues more than a predetermined determination time period. As the determination time, for instance, the cycle of the AC power-supply voltage Vac is used.

Note that the power shutdown detection unit 111 is not necessarily limited to the example of detecting that the AC power-supply voltage Vac has been cut off based on the zero-cross signal Z. The power shutdown detection unit 111 may also detect the voltage value of the AC power-supply voltage Vac and determine that the AC power-supply voltage Vac has been cut off when the effective voltage value of the AC power-supply voltage Vac becomes 0 V.

In the ensuing explanation, the power shutdown detection unit 111 determining that the AC power-supply voltage Vac has been cut off is referred to as the "detection of power shutdown", and the power shutdown detection unit 111 not determining that the AC power-supply voltage Vac has been cut off is referred to as the "non-detection of power shutdown".

The execution control unit 101 selectively executes the execution mode where an image forming command which commands image formation by the image forming unit 40 is allowed to be received, and a standby mode where the image forming command is not received. The image forming command may be, for example, the pressing of the start key on the operational key part 476, or a command that is sent from a terminal device such as a personal computer that is connected to the outside via a communication path not shown.

The standby mode is the "standby mode" that is defined, for example, in Lot6 of the EuP Directive, and is a mode which means "a condition where the equipment is connected to the mains power source, depends on energy input from the mains power source to work as intended and provides only the following functions, which may persist for an indefinite time: reactivation function, or reactivation function and only an indication of enabled reactivation function". In the standby mode, while the ON operation of the power switch SW corresponding to the reactivation can be received, the operation of commanding image formation such as the pressing of the start key cannot be received.

When the execution control unit 101 detects a switching signal of the power switch SW in the standby mode; that is, when it is detected that the power switch SW has been turned ON, the execution control unit 101 executes the reactivation function for switching to the execution mode. In other words, the execution control unit 101 executes the execution mode when a switching command is received by the power switch SW during the execution of the standby mode.

The execution mode is, for example, the "active mode" defined in Lot6 of the EuP Directive, and is a mode which means "a condition in which the equipment is connected to the mains power source and at least one of the main function(s) providing the intended service of the equipment has been activated".

In the execution mode, the execution control unit 101 receives an image forming command such as the pressing of the start key. When the execution control unit 101 receives an image forming command, for example, causes the manuscript reading unit 5 to read the manuscript or causes the image forming unit 40 to form an image.

When the execution control unit 101 detects the switching signal of the power switch SW in the execution mode; that is, when it is detected that the power switch SW has been turned ON, the execution control unit 101 switches to the standby mode. In other words, the execution control unit 101 executes the standby mode when a switching command is received by the power switch SW during the execution of the execution mode.

In the case of a detection of power shutdown when the execution of the standby mode is started, the execution control unit 101 causes the storage unit 112 not to store the start mode information indicating the standby mode. Meanwhile, in the case of a non-detection of power shutdown when the execution of the standby mode is started, the execution control unit 101 causes the storage unit 112 to store the start mode information indicating the standby mode.

Moreover, in the case of a detection of power shutdown when the execution of the execution mode is started, the execution control unit 101 causes the storage unit 112 not to store the start mode information indicating the execution mode. Meanwhile, in the case of a non-detection of power shutdown when the execution of the execution mode is started, the execution control unit 101 causes the storage unit 112 to store the start mode information indicating the execution mode.

Moreover, in a state where the operational power-supply voltage Vdc is not supplied from the power supply unit 8 to the control unit 100, for instance, as a result of the power plug 7 being pulled out from the outlet of the commercial AC power, the execution control unit 101 is started when the power plug 7 is once again inserted into the outlet and the supply of the operational power-supply voltage Vdc is started. When the execution control unit 101 is started, the execution control unit 101 executes the mode indicated by the start mode information stored in the storage unit 112.

As an example of the operation of the execution mode, the execution control unit 101 executes the operation of turning the switching element 454 ON/OFF in sync with the zero-cross timing indicated by the zero-cross signal Z. The execution control unit 101 can thereby control the heating operation by the heater 453. Here, the execution control unit 101 can subject the switching element 454 to so-called zero-volt switching by turning the switching element 454 ON/OFF in sync with the zero-cross timing. It is thereby possible to reduce the voltage value stress that is applied to the switching element 454.

As described above, the zero-cross detection circuit 9 detects the zero-cross timing for subjecting the switching element 454 to zero-volt switching. In addition, the power shutdown detection unit 111 detects the power discontinuity based on the zero-cross timing detected by the zero-cross detection circuit 9. It is thereby possible to commonly use the zero-cross detection circuit 9 for the purpose of zero-volt switching and for the purpose of detecting the power shutdown. Accordingly, it is possible to easily reduce costs in comparison to cases of separately providing a circuit for detecting the power shutdown such as a voltage value detection circuit for detecting the AC power-supply voltage Vac in order to detect the power discontinuity.

Figure 4:
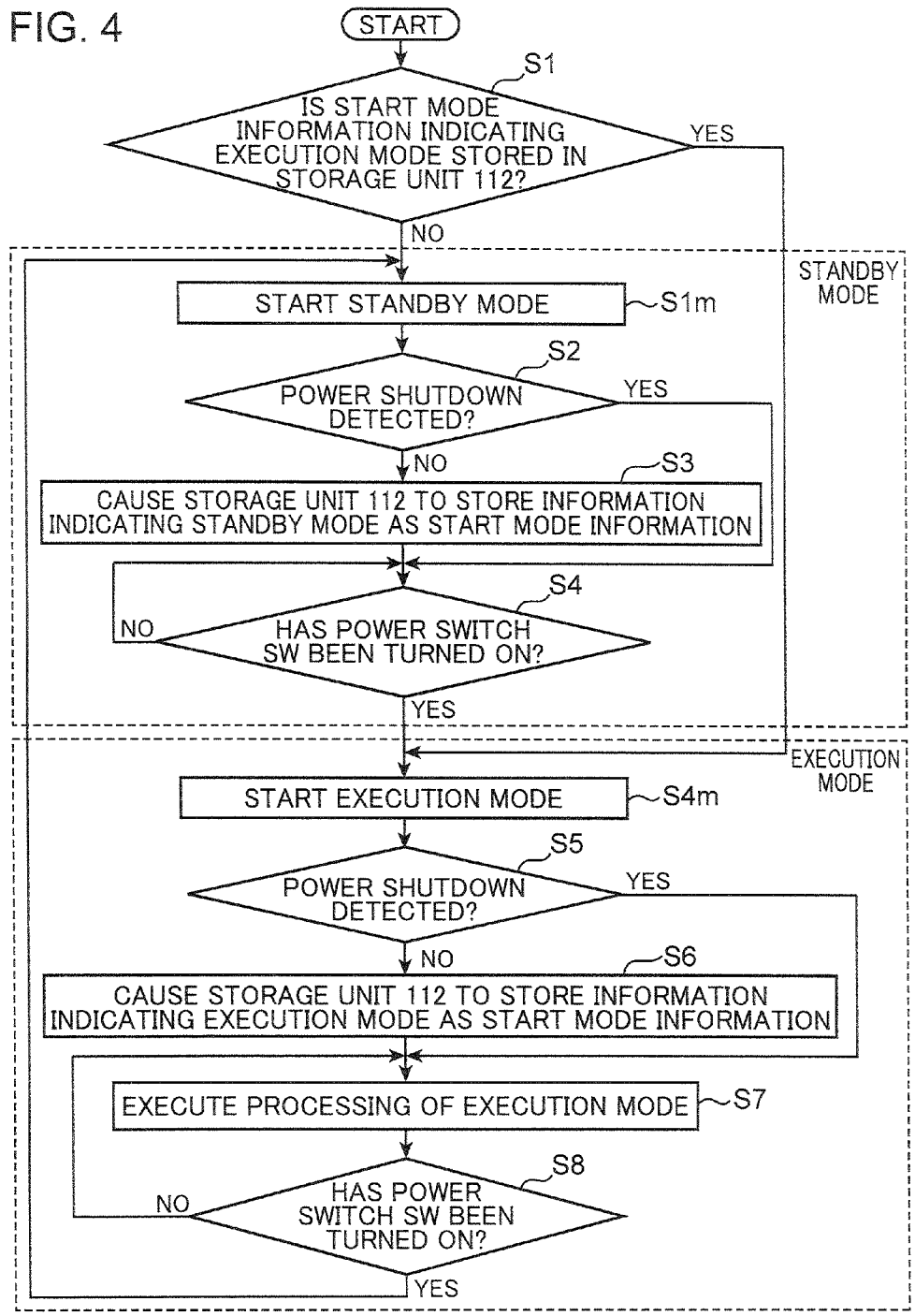
FIG. 4 is a flowchart showing an example of the operation of the copying machine shown in FIG. 2.

FIG. 4 is a flowchart showing an example of the operation of the copying machine 1 shown in FIG. 2. Foremost, for instance, when the AC power-supply voltage Vac is supplied to the power supply unit 8 as a result of the user inserting the power plug 7 into an outlet, the power supply unit 8 generates an operational power-supply voltage Vdc. Subsequently, the power supply unit 8 supplies the operational power-supply voltage Vdc to the respective parts within the copying machine 1. Consequently, the control unit 100 that received the supply of the operational power-supply voltage Vdc is started, and the execution control unit 101 is started.

When the execution control unit 101 is started, the execution control unit 101 foremost confirms whether the start mode information indicating the execution mode is stored in the storage unit 112 (step S1). When the start mode information indicating the execution mode is not stored in the storage unit 112 (step S1: NO), the execution control unit 101 proceeds to step S1m and starts the execution of the standby mode (step S1m). Steps S1m to S4 show the operation of the standby mode.

Meanwhile, when the start mode information indicating the execution mode is stored in the storage unit 112 (step S1: YES), the execution control unit 101 proceeds to step S4m, and starts the execution of the execution mode (step S4m). Steps S4m to S8 show the operation of the execution mode.

Based on the processing of step S1, the execution control unit 101 can start the operation upon start-up based on the mode that was being used during the previous power shutdown.

In step S1m, when the standby mode is started, the execution control unit 101 confirms whether the power shutdown was detected by the power shutdown detection unit 111 (step S2). When the power shutdown is not detected when the standby mode is started (step S2: NO), the execution control unit 101 causes the storage unit 112 to store information indicating the standby mode as the start mode information (step S3). Meanwhile, when the power shutdown is detected when the standby mode is started (step S2: YES), the execution control unit 101 proceeds to step S4 without causing the storage unit 112 to store information indicating the standby mode as the start mode information.

Based on the processing of foregoing steps S1m to S3, since the power shutdown will not be detected in step S2 unless the user pulls out the power plug 7 from the outlet or a power outage occurs, information indicating the standby mode as the start mode information is stored immediately after the standby mode is started (step S3). Consequently, when the AC power-supply voltage Vac is cut off as a result of the user pulling out the power plug 7 from the outlet or due to an occurrence of a power outage during the operation of the standby mode of waiting for the power switch SW to be turned ON in step S4, upon re-start, it is possible to start from the operation of the standby mode once again in step S1.

Subsequently, in step S4, the execution control unit 101 confirms whether the power switch SW has been turned ON (step S4). When the power switch SW has not been turned ON (step S4: NO), the execution control unit 101 repeats step S4, and maintains the operation of the standby mode.

Meanwhile, when the power switch SW has been turned ON (power ON operation) (step S4: YES), the execution control unit 101 proceeds to step S4m, and starts the execution mode (step S4m).

When the execution mode is started in step S4m, the execution control unit 101 confirms whether a power shutdown was detected by the power shutdown detection unit 111 (step S5).

When a power shutdown was not detected (step S5: NO), the execution control unit 101 causes the storage unit 112 to store information indicating the execution mode as the start mode information (step S6). Meanwhile, when a power shutdown was detected (step S5: YES), the execution control unit 101 proceeds to step S7 without causing the storage unit 112 to store information indicating the execution mode as the start mode information.

Based on the processing of foregoing steps S4m to S6, since the power shutdown will not be detected unless the user pulls out the power plug 7 from the outlet or a power outage occurs before step S5, information indicating the execution mode as the start mode information is stored immediately after the start of the execution mode (step S6). Consequently, when the AC power-supply voltage Vac is cut off as a result of the user pulling out the power plug 7 from the outlet or due to an occurrence of a power outage during the operation of the execution mode, upon re-start, it is possible to start from the operation of the execution mode once again in step S1.

Here, in step S4, when power discontinuity occurs as a result of the user pulling out the power plug 7 from the outlet or due to an occurrence of a power outage, the power supply unit 8 continues supplying the operational power-supply voltage Vdc for a brief power maintenance period; for example, for a period of about 6 seconds. Thus, when the power switch SW is turned ON within the power maintenance period after the occurrence of power discontinuity (step S4: YES), the execution control unit 101 executes the execution mode (step S4m).

In the foregoing case, assuming that information indicating the execution mode is stored as the start mode information in step S6, even though the power switch SW was actually turned ON after the occurrence of power discontinuity, the copying machine 1 will be started in the execution mode during the subsequent re-start, and result in an unnatural operation.

Nevertheless, in the foregoing case, the result will be a detection of power shutdown in step S5 (step S5: YES), and step S6 is not executed. Consequently, information indicating the standby mode will remain stored in the storage unit 112 as the start mode information. It is thereby possible to improve the certainty that, when an external power supply is cut off and the supply of power is thereafter resumed, the copying machine 1 will be started in the mode that was being used when the power supply was cut off.

Subsequently, in step S7, the execution control unit 101 executes the processing of the execution mode; for example, the processing of the image forming unit 40 forming an image on a sheet (step S7).

Subsequently, in step S8, the execution control unit 101 confirms whether the power switch SW is turned ON (step S8). When the power switch SW is not turned ON (step S8: NO), the execution control unit 101 repeats steps S7 and S8, and maintains the operation of the execution mode.

Meanwhile, when the power switch SW has been turned ON (power OFF operation) (step S8: YES), the execution control unit 101 proceeds to step S1m in order to start the standby mode.

Here, in steps S7 and S8, when power discontinuity occurs due to the user pulling out the power plug 7 from the outlet or due to an occurrence of a power outage, the power supply unit 8 continues supplying the operational power-supply voltage Vdc for a power maintenance period. Thus, when the power switch SW is turned ON within the power maintenance period after the occurrence of power discontinuity (step S8: YES), the execution control unit 101 proceeds to step S1m in order to execute the standby mode.

In the foregoing case, assuming that information indicating the standby mode is stored as the start mode information in step S3, even though the power switch SW was actually turned ON (power OFF operation) after the occurrence of power discontinuity, the copying machine 1 will be started in the standby mode during the subsequent re-start, and result in an unnatural operation.

Nevertheless, in the foregoing case, the result will be a detection of power shutdown in step S2 (step S2: YES), and step S3 is not executed. Consequently, information indicating the execution mode will remain stored in the storage unit 112 as the start mode information. It is thereby possible to improve the certainty that, when an external power supply is cut off and the supply of power is thereafter resumed, the copying machine 1 will be started in the mode that was being used when the power supply was cut off.

As explained above, according to the copying machine 1 shown in FIG. 2, since the start mode information is not changed after external power supply to the apparatus is cut off as a result of the power plug 7 of the copying machine 1 being pulled out from the outlet or due to an occurrence of a power outage, it is possible to improve the certainty that, when an external power supply is cut off and the supply of power is thereafter resumed, the copying machine 1 will be started in the mode that was being used when the power supply was cut off.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus, comprising:
a power receiving unit for receiving an external power-supply voltage;
a power supply unit for generating a predetermined operational power-supply voltage based on the power-supply voltage received by the power receiving unit, the power supply unit having an electricity storage portion to continue supplying the operational power-supply voltage for a brief power maintenance period after the external power-supply voltage is cut off;
an image forming unit for forming an image on a sheet;
a switching command receiving unit for receiving a switching command which commands switching between an execution mode where an image forming command which commands image formation by the image forming unit is allowed to be received and a standby mode where the image forming command is not received;
a nonvolatile storage unit for storing start mode information which indicates a mode of either the standby mode or the execution mode to be executed upon start-up;
an execution control unit which runs with the operational power-supply voltage and selectively executes the execution mode and the standby mode as well as controls the storage unit; and
a power shutdown detection unit for detecting that the power-supply voltage has been cut off,
wherein the execution control unit:
is started when supply of the operational power-supply voltage is started and executes a mode which is indicated by the start mode information stored in the storage unit;
executes the execution mode when the switching command is received by the switching command receiving unit during execution of the standby mode;

executes the standby mode when the switching command is received by the switching command receiving unit during execution of the execution mode;

causes the storage unit not to store information indicating the standby mode as the start mode information if the power shutdown detection unit detects that the power-supply voltage has been cut off when the standby mode is started and even if the switching command receiving unit receives the switching command during the brief power maintenance period after the detection of the cutting off, and causes the storage unit to store information indicating the standby mode as the start mode information if the power shutdown detection unit does not detect that the power-supply voltage has been cut off when the standby mode is started; and causes the storage unit not to store information indicating the execution mode as the start mode information if the power shutdown detection unit detects that the power-supply voltage has been cut off when the execution mode is started and even if the switching command receiving unit receives the switching command during the brief power maintenance period after the detection of the cutting off, and causes the storage unit to store information indicating the execution mode as the start mode information if the power shutdown detection unit does not detect that the power-supply voltage has been cut off when the execution mode is started.

2. The image forming apparatus according to claim 1, wherein the power-supply voltage is an AC power-supply voltage, the image forming apparatus further comprises a zero-cross detection circuit for outputting a zero-cross signal indicating that the AC power-supply voltage has passed through 0 V, the power shutdown detection unit determines that the power-supply voltage has been cut off when a state where the zero-cross signal is not output from the zero-cross detection circuit continues more than a predetermined determination time period, the image forming unit includes:

a heating unit for heating a toner image transferred to a sheet; and a switching element for turning supply of the AC power-supply voltage to the heating unit on and off, and the execution control unit controls operation of the switching element based on the zero-cross signal as the execution mode.

3. An image forming apparatus, comprising:

a power receiving unit for receiving an external power-supply voltage;

a power supply unit for supplying a predetermined operational power-supply voltage based on the power-supply voltage received by the power receiving unit, the power supply unit having an electricity storage portion to continue supplying the operational power-supply voltage for a brief power maintenance period after the external power-supplied voltage is caught off;

an image forming unit for forming an image on a sheet;

a switching command receiving unit for receiving a switching command which commands switching between an execution mode where an image forming command which commands image formation by the image forming unit is allowed to be received and a standby mode where the image forming command is not received;

a nonvolatile storage unit for storing start mode information which indicates a mode of either the standby mode or the execution mode to be executed upon start-up;

an execution control unit that runs with the operational power-supply voltage and selectively executes the execution mode and the standby mode as well as controls the storage unit; and a power shutdown detection unit for detecting that the power-supply voltage has been cut off, wherein the execution control unit:

causes the storage unit to store information indicating the mode that is given in the switching command as the start mode information if the switching command receiving unit receives the switching command before the power shutdown detection unit detects that the power-supply voltage has been cut off; and causes the storage unit not to store information indicating the mode that is given the switching command as the start mode information if the switching command receiving unit receives the switching command while the electricity storage portion supplies the operational power supply voltage for the power maintenance period after the power shutdown detection unit detects that the power-supply voltage has been cut off.

* * * * *